(12) United States Patent
Shimoda et al.

(10) Patent No.: US 6,339,804 B1
(45) Date of Patent: Jan. 15, 2002

(54) FAST-FORWARD/FAST-BACKWARD INTERMITTENT REPRODUCTION OF COMPRESSED DIGITAL DATA FRAME USING COMPRESSION PARAMETER VALUE CALCULATED FROM PARAMETER-CALCULATION-TARGET FRAME NOT PREVIOUSLY REPRODUCED

(75) Inventors: Toshiaki Shimoda; Takashi Morita; Toshiro Yamashita; Tetsuya Takahashi; Yoshiro Nishimoto, all of Kobe; Kazushige Harada, Tokyo, all of (JP)

(73) Assignee: Kabushiki Kaisha Seiko Sho., Kobe (JP)

( * ) Notice: Subject to any disclaimer, the term of this patent is extended or adjusted under 35 U.S.C. 154(b) by 0 days.

(21) Appl. No.: 09/233,184

(22) Filed: Jan. 20, 1999

(30) Foreign Application Priority Data

Jan. 21, 1998 (JP) ............................................ 10-009409
Jul. 7, 1998 (JP) ............................................ 10-191431

(51) Int. Cl.⁷ ................................................ G06F 13/12
(52) U.S. Cl. ............................. 710/68; 710/65; 341/51; 381/22; 382/166; 382/232; 382/233; 382/234; 382/235; 709/247; 704/207; 360/1; 360/13
(58) Field of Search .............................. 341/50, 51, 55, 341/88; 381/22, 23; 382/166, 232, 233–239, 243; 704/207, 238; 709/247; 710/65, 68; 360/1, 5, 6, 8, 13, 18, 24–27, 31, 40, 55, 71, 72.1, 72.2, 73.01, 73.08, 10.1, 11.1, 35.1; 369/13–15, 47, 65, 60, 83, 84, 86–88, 131, 132, 166; 386/6, 7, 27, 33, 35, 68, 109, 110–112, 121, 124

(56) References Cited

U.S. PATENT DOCUMENTS 4,393,415 A  * 7/1983  Hurst .......................... 386/109
5,353,062 A  * 10/1994 Maeda .......................... 348/412
5,371,602 A  * 12/1994 Tsuboi et al. ................ 386/111
5,535,356 A  * 7/1996  Kim et al. ..................... 711/103
5,576,950 A  * 11/1996 Tonomura et al. ........... 386/121
5,806,024 A  * 9/1998  Ozawa ........................... 704/222
5,828,995 A  * 10/1998 Satyamurti et al. .......... 704/211
5,841,941 A  * 11/1998 Morimoto et al. ............ 386/95
5,856,930 A  * 1/1999  Hosono ........................ 348/396
5,896,099 A  * 4/1999  Yamauchi ..................... 341/50
6,101,276 A  * 8/2000  Adiletta et al. .............. 382/236
6,141,637 A  * 10/2000 Kondo .......................... 704/204
6,222,693 B1 * 4/2001  Aoki et al. .................... 360/53
6,222,979 B1 * 4/2001  Willis et al. .................. 386/46
6,226,443 B1 * 5/2001  Morioka et al. .............. 386/82
6,229,951 B1 * 5/2001  Schultz et al. ................ 386/68
6,240,138 B1 * 5/2001  Koishikawa et al. ... 375/240.28
6,249,613 B1 * 6/2001  Crinon et al. ................ 382/236

FOREIGN PATENT DOCUMENTS

JP          07-250300          3/1994
JP          08-095596          9/1994
JP          09-214879          2/1996

* cited by examiner

*Primary Examiner*—Thomas Lee
*Assistant Examiner*—Tanh Q. Nguyen
(74) *Attorney, Agent, or Firm*—Reed Smith Hazel & Thomas LLP

(57) ABSTRACT

A digital information reproduction apparatus for compressing frames of data so as to intermittently reproduce the data in fast-forward speed. A data re-write device retrieves a reproduction-target frame for the fast-forward reproduction and a parameter-calculation-target frame exclusively for calculation of the frame data parameters. The frames then are transferred to a RAM. A decoder determines the frame data in the RAM, calculates the parameter-calculation frame data, and decodes the reproduction frame data by use of the parameter obtained as above. The described operation prevents expending the reproduction frame data with an incorrect parameter so as to normally fast-forward reproduce the compressed data. Furthermore, the present can select a frame used in the fast forward reproduction according to a feature index so that a section subjected to the fast-forward reproduction can be easily grasped by the user.

14 Claims, 7 Drawing Sheets

FAST-FORWARD/FAST-BACKWARD INTERMITTENT REPRODUCTION OF COMPRESSED DIGITAL DATA FRAME USING COMPRESSION PARAMETER VALUE CALCULATED FROM PARAMETER-CALCULATION-TARGET FRAME NOT PREVIOUSLY REPRODUCED

BACKGROUND OF THE INVENTION

1. Field of the Invention

The present invention relates to a digital information reproduction apparatus by which fast-forward reproduction of digital information compressed and stored can be performed. Particularly, the digital information to be reproduced includes music data and graphics data.

2. Description of the Related Art

With a fast-forward reproduction apparatus stored in a storage medium, such as a minidisk (MD), normally, digital information is intermittently expanded and reproduced so that the fast-forward reproduction is performed. Specifically, frames of data are intermittently retrieved by a host processor from the storage medium, the intermittently retrieved frames of data are serially decoded by a decoder, and reproduced so that the fast-forward reproduction is performed. This method is adopted because of the fact that when the digital data in the storage medium is to be reproduced continuously at a high speed, the data rate becomes so much larger than that of standard reproduction that expansion processing (decoding) cannot follow the high speed. Accordingly, with such fast-forward reproduction, the reproduced information is discontinuous.

Digital-information compression methods include a method, such as a TwinVQ (Transformed Weighted Interleave Vector Quantization) method developed at the HI laboratory of NTT, which utilizes a predetermined parameter obtained in compression of a frame of data to compress the following frame of data. With such a method, decoding of a frame of data needs to be performed in accordance with the aforementioned parameter obtained from the previous frame of data.

The TwinVQ method uses parameters, each of which represents a spectrum envelope, averaged so as to be used for plural frames of data. An LCP parameter, which is called an LSP, is one of the parameters as described above. However, not only the LPC parameter, but other parameters directly representing the spectrum envelope are also used.

As described above, normal fast-forward reproduction of digital information such as that compressed by the TwinVQ method cannot be performed with a simple intermittent reproduction method. For example, with the TwinVQ method, for compression of a frame of data, a parameter obtained in the compression of two immediately-previous frames is used; therefore, for normally decoding a frame of data, a parameter obtained from two immediately-previous frames of data is required.

For example, for fast-forward reproduction at a rate of one frame out of ten frames, in the same method as in the case of the CD, suppose frames of data be retrieved by a host processor at the above rate and the frames thereby retrieved are serially decoded by a decoder. In this case, as shown in FIG. 7, for decoding a frame F21, a parameter obtained from two immediately-previous frames (F1 and F11) decoded is used. In this way, for normally decoding frame F21, a parameter obtained from frames F19 and F20 is in fact required.

Because of these facts, with a reproduction method such as that described above, normal fast-forward reproduction of the digital information compressed by the TwinVQ method cannot be performed.

SUMMARY OF THE INVENTION

In consideration of the aforementioned situation, the present invention aims to provide a digital information reproduction apparatus with which a parameter obtained in compression of a frame of data is utilized to compress the following frame of data, by which the fast-forward reproduction that intermittently reproduces the digital information can be implemented.

In another aspect of the situation, for high-speed reproduction, such as the fast-forward reproduction, a selected section is required to sufficiently represent characteristics of audio data; otherwise, the user will have a difficulty in grasping parts for which the fast-forward reproduction are performed. However, when the reproduction is repeated at a predetermined interval of an n section, sections sufficiently representing the audio-data characteristics are not always assured to be the selections.

For elimination of these problems with the conventional techniques, the present invention aims to modify the conventional reproduction apparatus so as to provide an improved reproduction apparatus. With the improved apparatus of this invention, a section reproduced in high-speed reproduction, such as fast-forward or fast-backward reproduction, is selected according to the audio-data characteristics so that the user can grasp the reproduced part.

To these ends, according to one aspect of the present invention, a digital information reproduction apparatus is provided, which comprises storing means storing digital data on a frame basis which is compressed according to a predetermined compression method; reading means to read the compressed digital data stored in the storing means; parameter-calculating means to calculate a compression parameter value on the frame basis, which has been used in the compression of the digital data read out by the reading means; decoding operation means to decode the compressed digital data read by the reading means, the decoding operation means using the compression parameter value calculated in a decoding operation by the parameter-calculation means; reproduction-target-frame selecting means to intermittently perform selection of a reproduction-target frame among a plurality of the frames stored in the storing means, the selection being performed when a command for a fast-forward or fast-backward operation is issued; parameter-calculation-target-frame selecting means to select a calculation-target frame of the compression parameter value required for the fast-forward or fast-backward operation; and fast-reproduction controlling means to allow the parameter-calculating means to calculate the compression parameter value of the parameter-calculation-target frame selected by the parameter-calculation-target-frame selecting means and to allow the decoding operation to be performed to decode the digital data of the reproduction-target frame selected by the reproduction-target-frame selecting means.

In the digital information reproduction apparatus, the frames may be arranged to have a time-series configuration.

Furthermore, for decoding reproduction to be performed by intermittent selection in the fast-forward reproduction, a frame may be arranged to be selected only for parameter-calculation, not for the reproduction.

The term "compression parameters" used herein refers to parameters that have been used in compression of the digital data. The compression parameters are related to frames other than those to be reproduced, but they can be used for accurate decoding and appropriate selection of reproduction-target frames. For example, the compression parameters are required for decoding of other frames than those to be reproduced, the proper compression parameters are used to allow appropriate fast-forward reproduction. Further, use of these compression parameters allows selection of a target frame for intermittent reproduction.

In connection with these compressed parameters, a notable case can be seen in that when the predetermined compression method is to use the compressed parameter value of the predetermined previous frame to decode one of the frames. In such a case, selection of a reproduction-target frame and the predetermined previous frame allows the reproduction-target frame of data to be decoded and reproduced accurately.

When data to be used is sound-data and a compression method uses compression data including a parameter that represents a spectrum envelope, the parameter representing the spectrum envelope is one of the compression parameters described above.

For a compression method such as that described above, a TwinVQ method is frequently used. In this TwinVQ method, LPC parameters are used as the aforementioned compression parameters.

For a selection method of the reproduction-target-frame selecting means, a method to select reproduction-target frames arranged in time series at identical pitches can be considered to be adaptable.

According to another aspect of the present invention, the digital information reproduction apparatus further comprises a frame-feature index extracting means to calculate a feature index of each frame by using the compression parameter value output by the parameter-calculating means on the basis of a frame selected by the parameter-calculation-target-frame selecting means, in which when the command of the fast-forward operation is issued, the parameter-calculation-target-frame selecting means selects a predetermined number of frames following the immediate-previous frame reproduced, and the reproduction-target-frame selecting means selects the next reproduction-target frame in accordance with the feature indexes of plural frames which have been calculated by the frame-feature index extracting means.

In this digital information reproduction apparatus, it is preferable that a frame be selected, as the next reproduction-target frame, which is the most different in the feature index from the immediately-previous frame reproduced or which largely varies in the feature index.

For the feature index, an arrangement is preferably made such as that when the digital data is sound-data and the compression method provides compressed data that comprises a parameter representing at least one item of a spectrum envelope, sound power, pitch, and window size, the feature index is output by use of a parameter value included in the compressed data. Particularly, when the compression method is a TwinVQ method, the feature index is preferably arranged to be output by use of LPC parameters. It is further preferable that, in addition to the LPC parameters, parameters related to an item such as sound power or pitch.

With the apparatus having an arrangement as described above, even when high-speed reproduction such as fast-forward reproduction of audio data, for example, is performed, a reproduction frame can be selected according to the audio-data feature index so as to allow the listener to easily grasp a reproduced part. The listener will be able to grasp the reproduced part more easily when an arrangement is made such that a section is selected, as the next reproduction-target frame, which varies in the feature index, such as a frame which is the most different in the feature index from the immediately-previous frame reproduced.

Another modification is described here, which may be applied to the digital information reproduction apparatus in accordance with the present invention. That is, the same operation device may be arranged to be used to perform the following two operations. One operation is to calculate a parameter value on a frame basis which has been used in compression of the digital data, and another operation is to decode compressed digital data by using a predetermined compression parameter value.

Alternatively of the above, an arrangement may be such that the fast-reproduction controlling means sends out the compressed digital data to the operation device and concurrently, sends out to the operation device an control signal which identifies whether the frame is a reproduction-target frame or a parameter-calculation-target frame.

According to an apparatus arranged as described above, the operation device does not need to recognize whether the reproduction to be performed is the fast-forward reproduction or the standard reproduction, and the processing can be performed by reference to the control signal; by which the entire apparatus can be simplified.

Furthermore, the digital information reproduction apparatus according to the present invention may be arranged to comprise an inverted-reproduction mode to perform reproduction in a sequence opposite to a time-series direction.

DESCRIPTION OF THE PREFERRED EMBODIMENTS

First Embodiment

Referring to the accompanying drawings, a description will be given of a preferred embodiment of the present invention. It will be understood that the embodiment is just one substantiated example of the invention and therefore, it does not restrict the technical scope of the invention.

Figure 1:
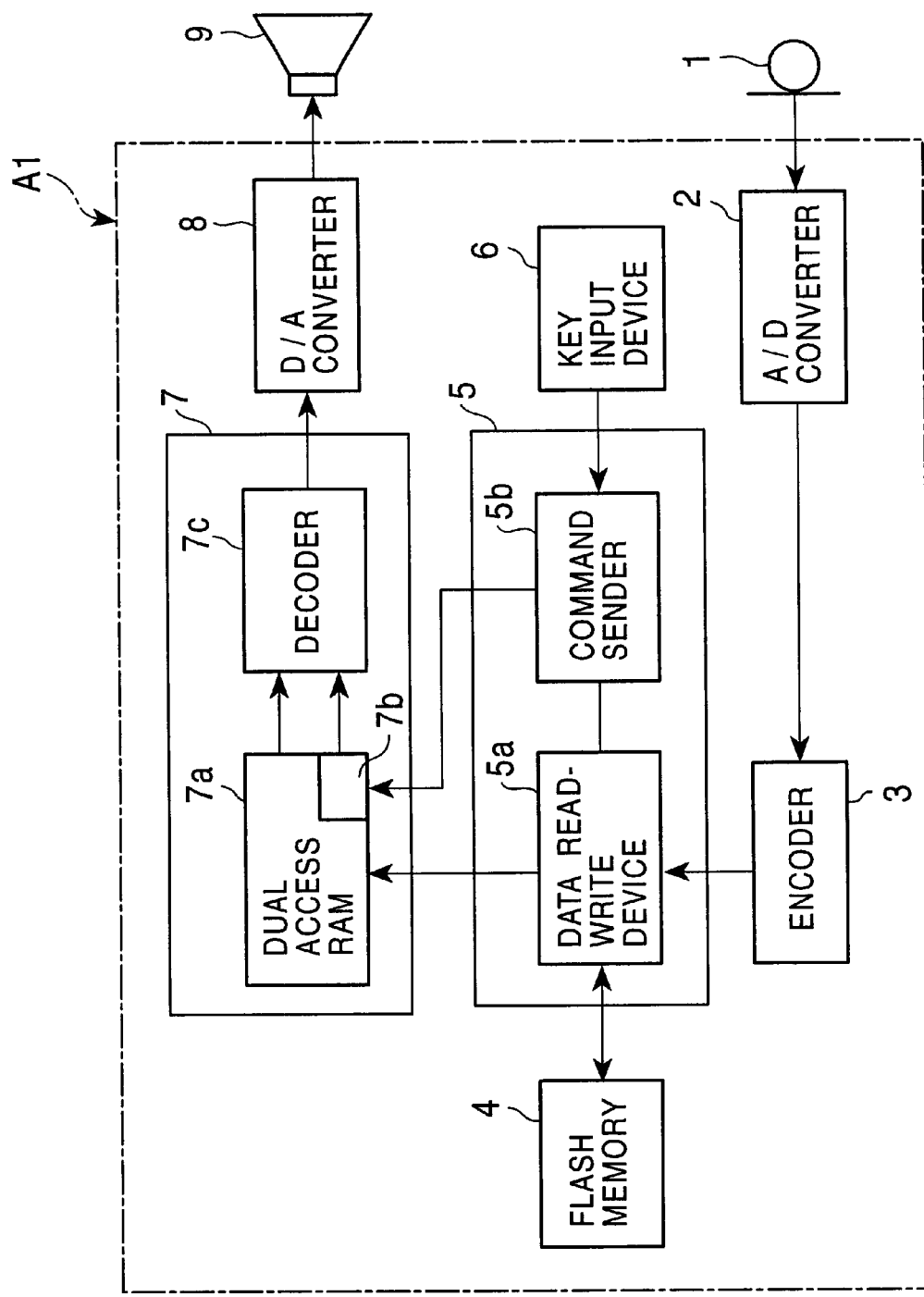
FIG. 1 is a schematic diagram showing a general configuration of a music information record reproduction apparatus A1 of an embodiment in accordance with the present invention.
Figure 2:
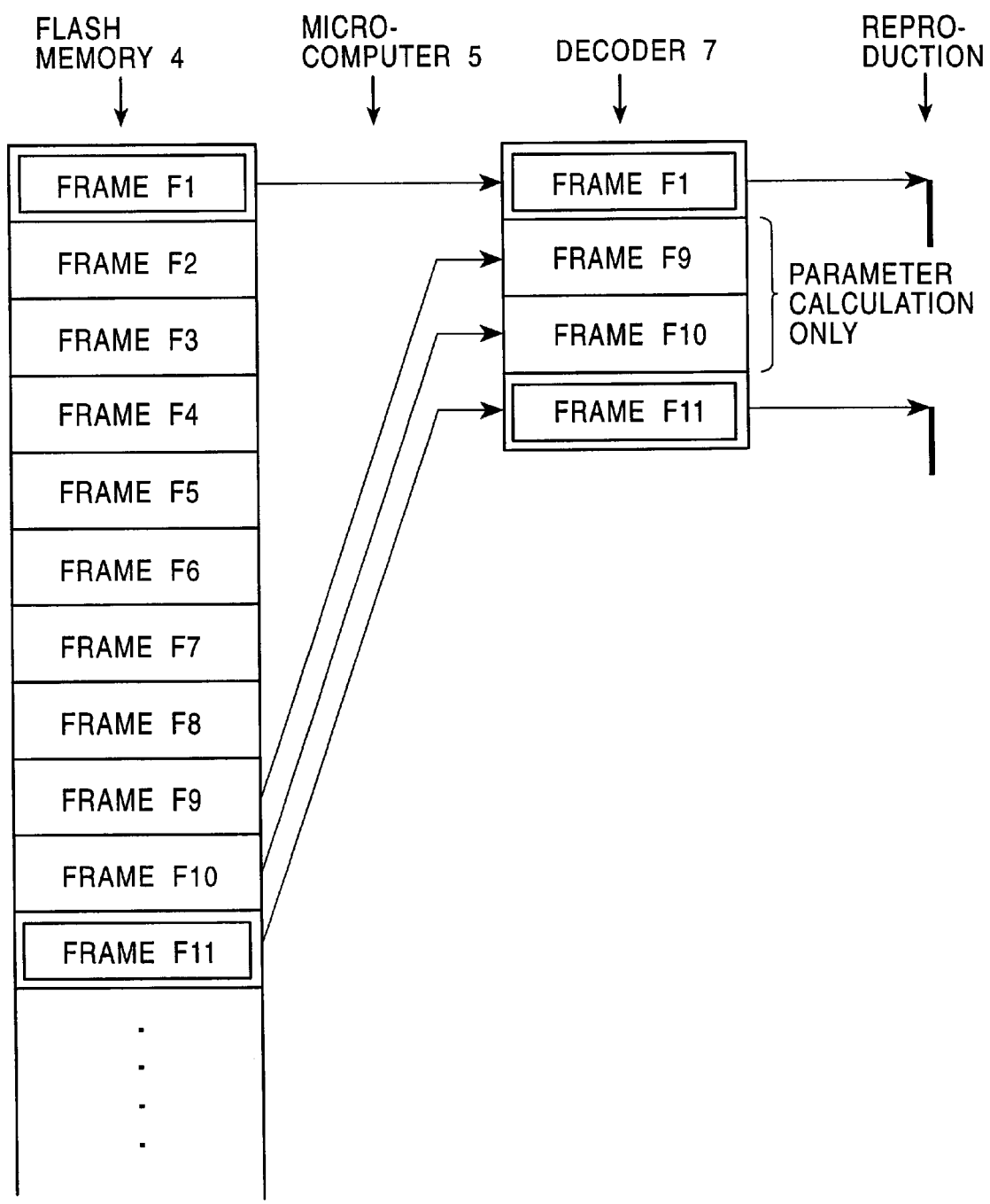
FIG. 2 is a diagram showing frames of data to be transferred from a microcomputer to a decoder in fast-forward reproduction by use of a TwinVQ method.
Figure 3:
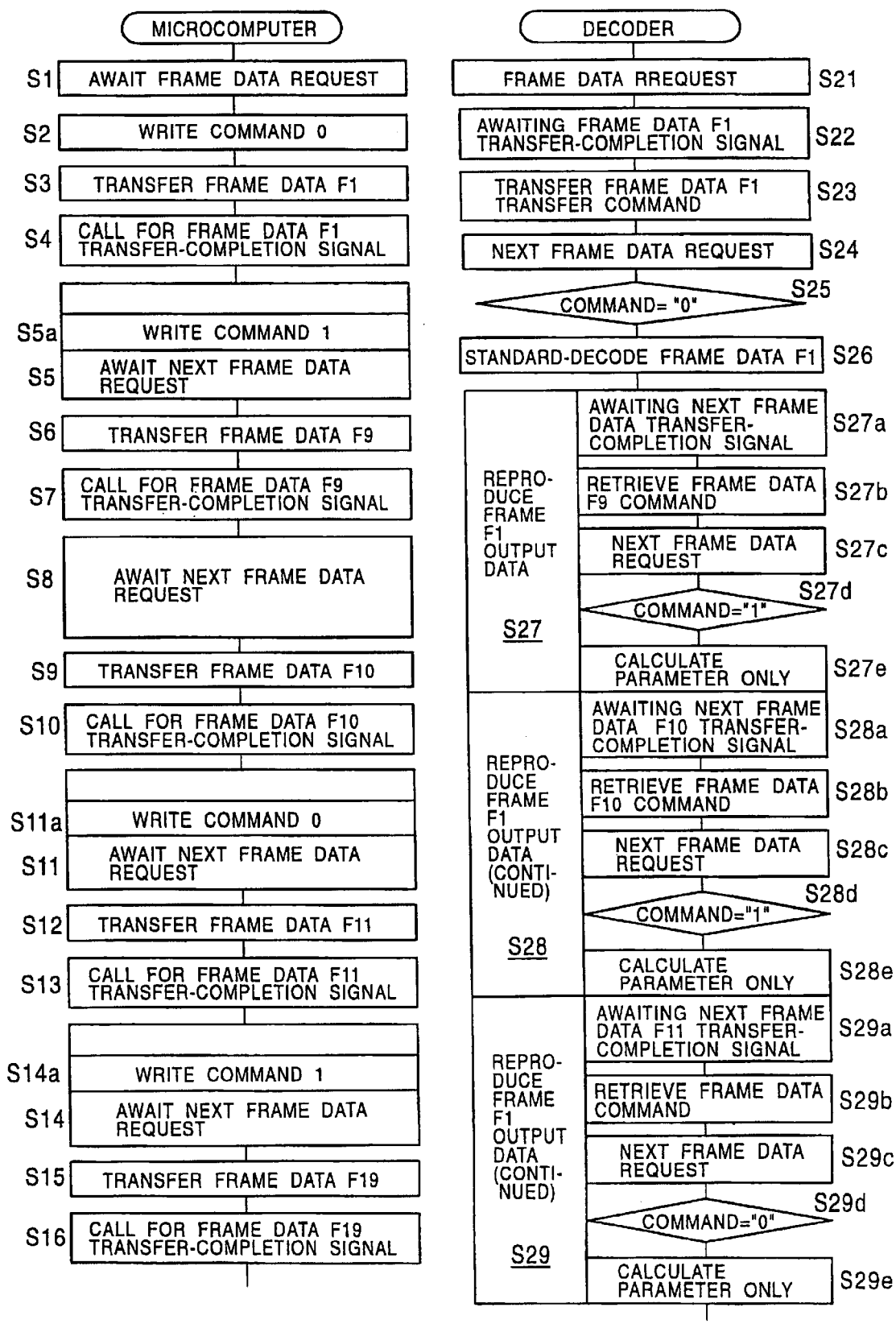
FIG. 3 is a flowchart showing a processing procedure of the fast-forward reproduction by the music information record reproduction apparatus A1.
Figure 4:
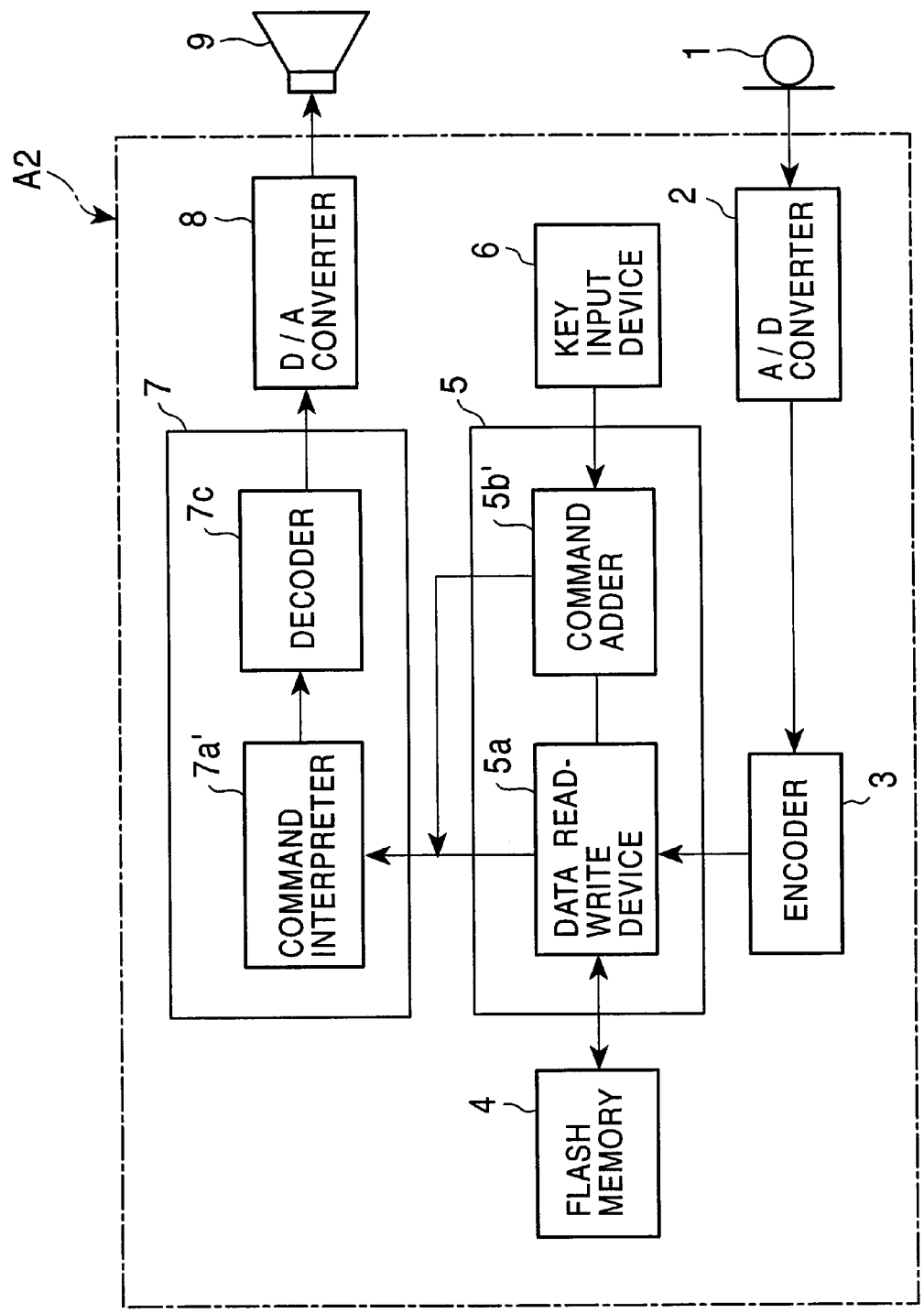
FIG. 4 is a schematic diagram showing a general configuration of a music information record reproduction apparatus A2 of another embodiment in accordance with the present invention.

FIG. 1 is a schematic diagram showing a general configuration of a music information record reproduction apparatus A1. FIG. 2 is a drawing showing items of frame data that are transferred to a decoder 7 from a microcomputer 5 when fast-forward reproduction is performed by use of a TwinVQ method. FIG. 3 is a flowchart showing an example of a processing procedure to be carried out in the fast-forward reproduction, and FIG. 4 is a schematic diagram showing a general configuration of a music information record reproduction apparatus A2.

The music information record reproduction apparatus A1 of this embodiment is an embodiment of a TwinVQ-used digital information reproduction apparatus as a music-information reproducing apparatus. This apparatus A1 has a configuration as shown in FIG. 1, which is described below.

A recording device is constituted by a microphone 1, an A/D converter 2, a TwinVQ encoder 3, a microprocessor 5, and a flash memory 4; and a reproduction device, which characterizes this invention, is constituted by the flash memory 4, the microprocessor 5, a TwinVQ decoder 7 (an example of expanding means), a D/A converter 8, and a speaker (an example of reproducing means). Further, the microprocessor 5 is constituted by a data read-write device 5a (an example of data-transferring means) and a command sender 5b (an example of control signal-sending means); and the TwinVQ decoder 7 is constituted by a dual-access RAM 7a and a decoder 7c. A key input device 6 receives inputs of operation commands, such as record, replay, fast-forward, backward-reproduce, and stop.

Music information is input through the microphone 1, digitized through the A/D converter 2, encoded (compressed) by a TwinVQ method through the TwinVQ encoder 3, and stored in the flash memory 4 through the data read-write device 5a of the microprocessor 5.

When the music information in the flash memory 4 is to be replayed, first, it is retrieved on a frame basis by the data read-write device 5a of the microprocessor 5. For a standard replay, all the frames of data are retrieved; while for a fast-forward replay (in this case, an intermittent replay is assumed to be performed at a rate of one frame in every ten frames), frame data is retrieved intermittently as described below.

With TwinVQ, when one frame of data is to be compressed, parameters output in compression of the immediately-previous two frames of data is used; therefore, when a frame of data is to be standard-decoded, parameters output from the immediately-previous two frames of data are required. Therefore, as shown in FIG. 2, for the fast-forward reproduction, in addition to the reproduction target frames of data, such as F1 and F11, the immediately-previous two frames of data (for example, frames F9 and F10) are retrieved. In this way, determinations are made based on the compression method (in this case, TwinVQ) used in the microprocessor 5 regarding which frames of data are to be retrieved for intended processing and whether the determined frames of data are used for the fast-forward reproduction or only for parameter-calculation.

The frames of data retrieved this way are serially transferred to the dual-access RAM 7a of the TwinVQ decoder 7. Before each of the frames of data are sent, the command sender 5b of the microprocessor 5 writes commands in a command region 7b of the dual-access RAM 7a in accordance with the type of processing to be performed for the data. For the data frame to be reproduced (reproduction frame data), the command sender 5b writes a command "0". For the data frame to be subjected only to parameter-calculation (parameter-calculation frame data), it writes a command "1". Therefore, according to this method, normally, "0" is written for all the frames of data which are to be reproduced; and "0" is written for the individual frames of data which are to be fast-forward reproduced, for example, F1 and F22 in FIG. 2, and "1" is written for the individual frames of data, for example, F9 and F10.

In the decoder 7c of the TwinVQ decoder 7, frame data in the dual-access RAM 7a is retrieved, and a determination is performed according to a command ("0" or "1") written in the command region 7b of the dual-access RAM 7a of whether the retrieved frame data is parameter-calculation frame data or the reproduction frame data. If the frame data is determined as parameter-calculation frame data, it is used for parameter-calculation and temporarily saved. On the other hand, if the frame data is determined as reproduction frame data, it is decoded by use of the parameter calculated out from the aforementioned parameter-calculation frame data, analog-converted through the D/A converter 8, then output from the speaker 9.

Next, referring to FIG. 3, a description will be given of an example of processing procedure to be carried out when the fast-forward reproduction of music information is performed by the music information record reproduction apparatus A1. Here, music information used in the processing in FIG. 3 is assumed to have the frame structure shown in FIG. 2.

Having received a fast-forward-reproduce command entered by the user through the key input device 6, the decoder 7 first issues a call for a request to the microprocessor 5 for a frame-data transfer (step [hereinafter referred to as "S"] 21), then is turned to a state of waiting for completion of the frame-data transfer (S22).

Having received the aforementioned request in a state of waiting for the frame-data transfer completion (S1), the microprocessor 5 transfers the frame data F1 to the dual-access RAM 7a of the decoder 7 (S3). However, prior to this transfer, the command sender 5b writes the command "0", which indicates the frame data F1 is reproduction frame data, in the command region 7b of the dual-access RAM 7a (S2). After the transfer of the frame data F1 is thus completed, the microprocessor 5 issue a call of a transfer completion signal to the decoder 7 (S4), it then turns to a state of waiting for another frame-data request (S5). At this stage, since the parameter-calculation frame data F9 is to follow, the command sender 5b writes the command "1" in the command region 7b of the dual-access RAM 7a prior to receiving the transfer request (S5a).

Having received the aforementioned request in a state of waiting for the frame-data transfer completion (S22), the decoder 7c retrieves the frame data F1 and the relevant command, respectively, from the dual-access RAM 7a and the command region 7b (S23) and calls the microprocessor 5 to request for the next frame data (S24). Then, the decoder 7c determines whether the retrieved command is "0" or "1", that is, whether the retrieved frame data F1 is the reproduction frame data or the parameter-calculation frame data. In this case stage "0" is set for the aforementioned command, in which the decoder 7c determines the retrieved frame data F1 to be the reproduction frame data (S25) and performs the standard-decoding of the frame data F1 (S26). Thereafter, the decode result is output to the D/A converter 8 and the reproduction starts (S27).

Having received a transfer request for the following frame data (S5), the microprocessor 5 transfers the parameter-calculation frame data F9 to the dual-access RAM 7a of the decoder 7 via the data read-write device 5a (S6). Upon completion of the transfer of the parameter-calculation frame data F9, the microprocessor 5 calls the decoder 7 for a transfer-completion signal (S7) and turns to a state of waiting for the next frame data request (S8). At this stage, since the parameter-calculation frame data F10 to follow and to be transferred is the same parameter-calculation frame data as the frame data F9 which has last been transferred, the command "1" is not repeatedly written.

Concurrently with the reproduction of the frame data F1 (S27), the decoder 7 receives a transfer-completion signal of the frame data F9 from the microprocessor 5 (S27a), retrieves the frame data F9 and the relevant command, respectively, from the dual-access RAM 7a and the command region 7b via the decoder 7c (S27b), and then calls the microprocessor 5 for the next frame data request (S27c). In accordance with the retrieved command, the frame data F9 is determined to be the parameter-calculation frame data (S27d), and only the parameter calculation is carried out by use of the frame data F9 (S27e); however, the decode result is not output to the D/A converter 8 (S28).

Having received the transfer request of the consecutive frame data F10 (S8), the microprocessor 5 transfers the parameter-calculation frame data F10 to the dual-access RAM 7a of the decoder 7 (S9) via the data read-write device 5a. Upon completion of the transfer of the frame data F10, the microprocessor 5 calls the decoder 7 for a transfer-completion signal (S10) and turns to a state of waiting for the next frame data request (S11). At this stage, since the parameter-calculation frame data F11 to follow and to be transferred is the reproduction frame data, different from the frame data F10 which has last been transferred, the command sender 5b writes the command "0" in the command region 7b of the dual-access RAM 7a (S11a).

The decoder 7, having received a transfer completion signal from the microprocessor 5 (S28a), retrieves the frame data F10 and the relevant command, respectively, from the dual-access RAM 7a and the command region 7b via the decoder 7c (S28b), and then calls the microprocessor 5 for the next frame data request (S28c). In accordance with the retrieved command, the frame data F10 is determined to be the parameter-calculation frame data (S28d), and only the parameter-calculation is carried out by use of the frame data F10 (28e); however, the decode result is not output to the D/A converter 8 (S29).

For reference, in S28 and S29, output data of the F1 frame which is accumulated in a buffer is also continuously being reproduced. That is, in the fast-forward reproduction, data calculation of the next target frame is performed concurrently with the reproduction of the previous data.

Having received the transfer request of the consecutive frame data F11 (S11), the microprocessor 5 transfers the reproduction frame data F11 to the dual-access RAM 7a of the decoder 7 (S12) via the data read-write device 5a. Upon completion of the transfer of the frame data F11, the microprocessor 5 calls the decoder 7 for a transfer-completion signal (S13) and turns to a state of waiting for the next frame data request (S14). At this stage, since the parameter-calculation frame data F19 to follow and to be transferred is the parameter-calculation frame data, different from the frame data F11 which has last been transferred, the command sender 5b writes the command "1" in the command region 7b of the dual-access RAM 7a (S14a).

The decoder 7, having received a transfer completion signal from the microprocessor 5 (S29a), retrieves the frame data F11 and the relevant command, respectively, from the dual-access RAM 7a and the command region 7b via the decoder 7c (S29a), and then calls the microprocessor 5 for the next frame data request (S29c). In accordance with the retrieved command, the frame data F11 is determined to be the reproduction frame data (S29d), and the standard-decoding of the frame data F11 is carried out by use of parameters calculated in the aforementioned S27e and S28e (29e), the decode result is output to the D/A converter 8, and then the reproduction starts.

As described above, with the music information record reproduction apparatus A1, the processing procedure is carried out as summarized below.

Information is compressed by use of the TwinVQ method. When the digital music information is fast-forward-reproduced, retrieval is performed of not only the reproduction frame data to be subjected to the fast-forward reproduction but also the parameter-calculation frame data used to calculate the parameter required to decode the reproduction frame data.

The retrieved frames of data are then transferred to the decoder 7 and prior to the frame-data transfer, commands to identify the two types of frame data are transferred to the decoder 7. In the decoder 7, the types of the received frame data are determined according to each of the commands, parameter-calculation is performed by use of the aforementioned parameter-calculation frame data, and the reproduction frame data is decoded by use of the parameter.

In this way, with the TwinVQ method, a frame of data is compressed and a parameter that is calculated out in the data compression is utilized to compress the following frame of data so as to intermittently reproduce the digital information, by which the fast-forward reproduction is performed; in which an incorrect parameter is not allowed to be used for decoding; therefore, proper fast-forward reproduction can be implemented.

Furthermore, in the aforementioned decoder 7, the matter of whether the fast-forward reproduction or the standard reproduction is performed does not need to be considered and only decoding to be performed with reference to the commands transferred from the microprocessor 5 is sufficient. This allows the total system to be simplified.

Compression methods other than the TwinVQ method may be applied to the configuration of the present invention. For example, IMDCT (inverse modified discrete cosign transform) can be applied. IMDCT allows a signal overlapped with the previous frame waveform to be output as a final signal when transformation is performed from a spectrum region to a time region; therefore, part of an IMDCT result in the previous frame is used for signal-overlapping.

Second Embodiment

In the music information record reproduction apparatus A1, a command that is an control signal example is arranged to be stored in the command region of the dual access RAM of the decoder 7. However, an arrangement may be such that concurrently with a frame-data transfer, an L signal or an H signal as the control signal is input to an I/O pin spaced from the decoder 7.

A configuration as in FIG. 4 can also be expected to provide advantages equivalent to those of the first embodiment.

For a music information record reproduction apparatus A2 in FIG. 4, a command adder 5b' is mounted to replace the command sender 5b (in the first embodiment) in the microcomputer 5 and a command interpreter 7a' is also mounted in the decoder 7.

In the music information reproduction (standard reproduction and fast-forward reproduction), in the same manner as that in the music information record reproduction apparatus A1, the data read-write device 5a retrieves predetermined frame data and transfers it to the decoder 7. At this stage, however, the command adder 5b' adds a command such as "0" or "1", which is the same as that in the music information record reproduction apparatus A1, at the first region of individual frame data.

In the decoder 7, upon receiving the frame data, the command interpreter 7a' refers to the command added in the first region of the frame data so as to determine whether the received frame data is reproduction frame data or parameter-calculation frame data. According to the determination by the command interpreter 7a', the decoder 7c processes the frame data (parameter-calculation only or standard-decoding).

As described above, when an arrangement is made so that the command (control signals) indicating whether the frame data is the reproduction frame data or the parameter-calculation frame data is added to the frame data to be sent from the microcomputer 5 to the decoder 7 and processing is performed according to the command in the decoder 7, the same advantages as those for the above two examples can be provided without use of the command region of RAM and the outside input/output (I/O) port.

Referring back to the term "fast-forward reproduction", it will be understood as a matter of course that the term used in the description of the embodiments refers to both the fast-forward reproduction and the fast-backward reproduction.

Third Embodiment

For further reference, with the TwinVQ described above, when PCM audio data is restored from encoded data, parameters such as sound power parameters, pitch parameters, LPC parameters, and the frequency-region fine structure parameters are also expanded. In the reproduction apparatus of these embodiments, these parameters are used for the fast-forward reproduction.

Figure 5:
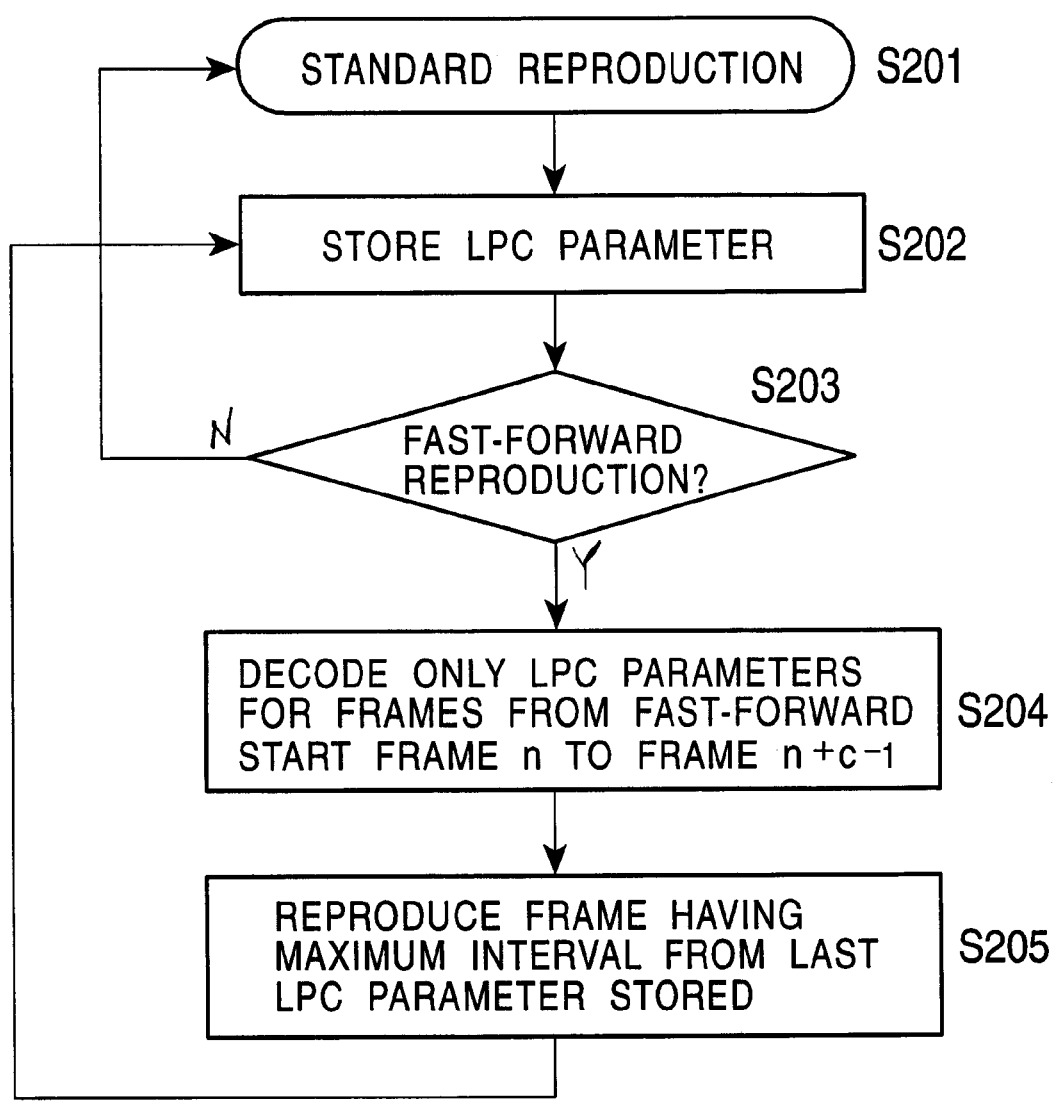
FIG. 5 is a flowchart showing a fast-forward reproduction procedure to be carried out by another embodiment in accordance with the present invention.

Hereinbelow, referring to FIG. 5, a description will be given of the performance of the aforementioned reproduction apparatus A2.

In the description, a "c" times speed of the fast-forward reproduction is assumed and the number of LPC parameters used is assumed to be "p". During standard reproduction (S201), p number of latest LPC parameters each are always pre-expanded by the decoder 7 and stored in a memory (processor-dedicated RAM) (S202). The LPC parameters are stored in an allocated memory region, for example, LAST-LPC[p].

Figure 6:
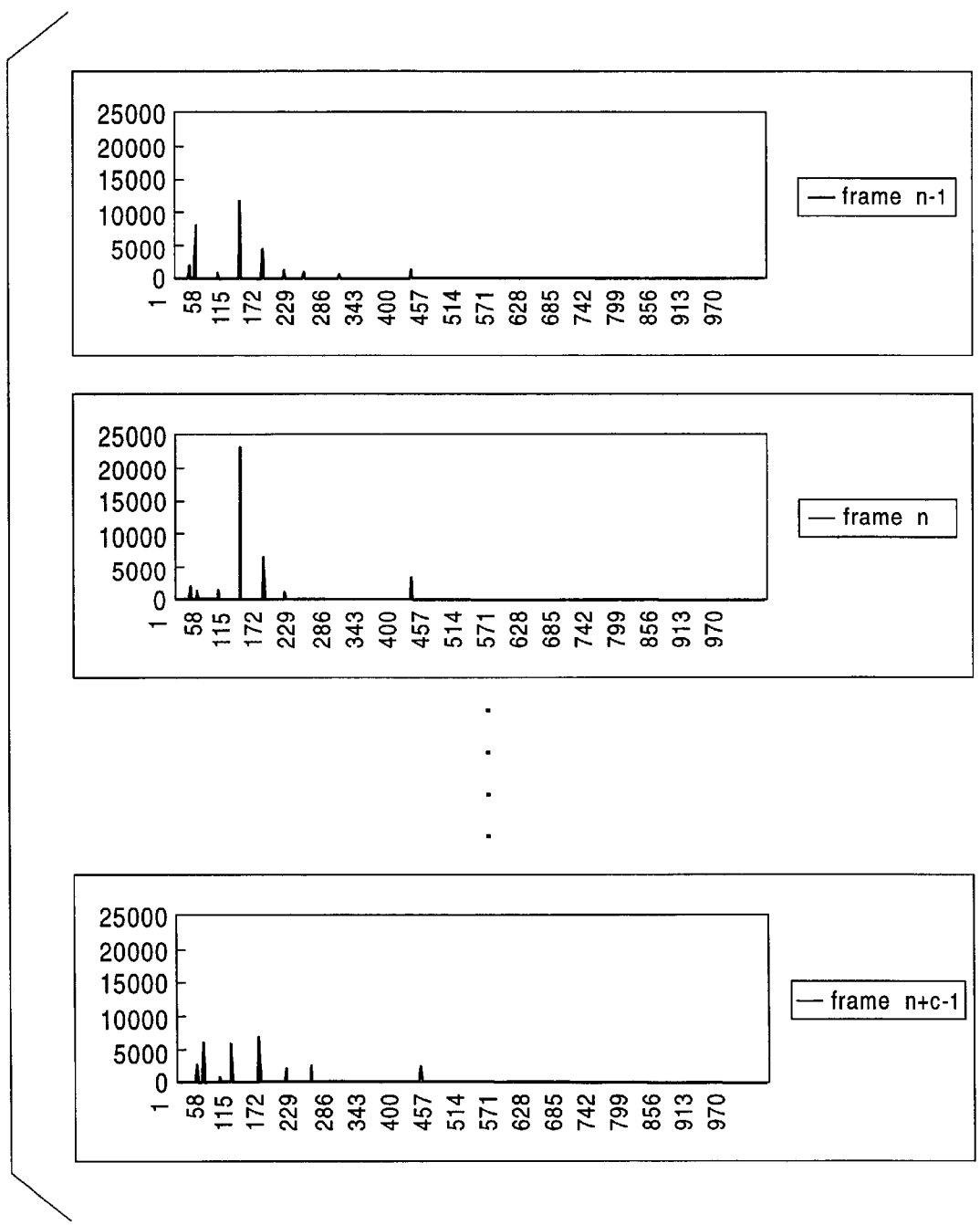
FIG. 6 is a set of graphs each showing an example of a sound power feature index.
Figure 7:
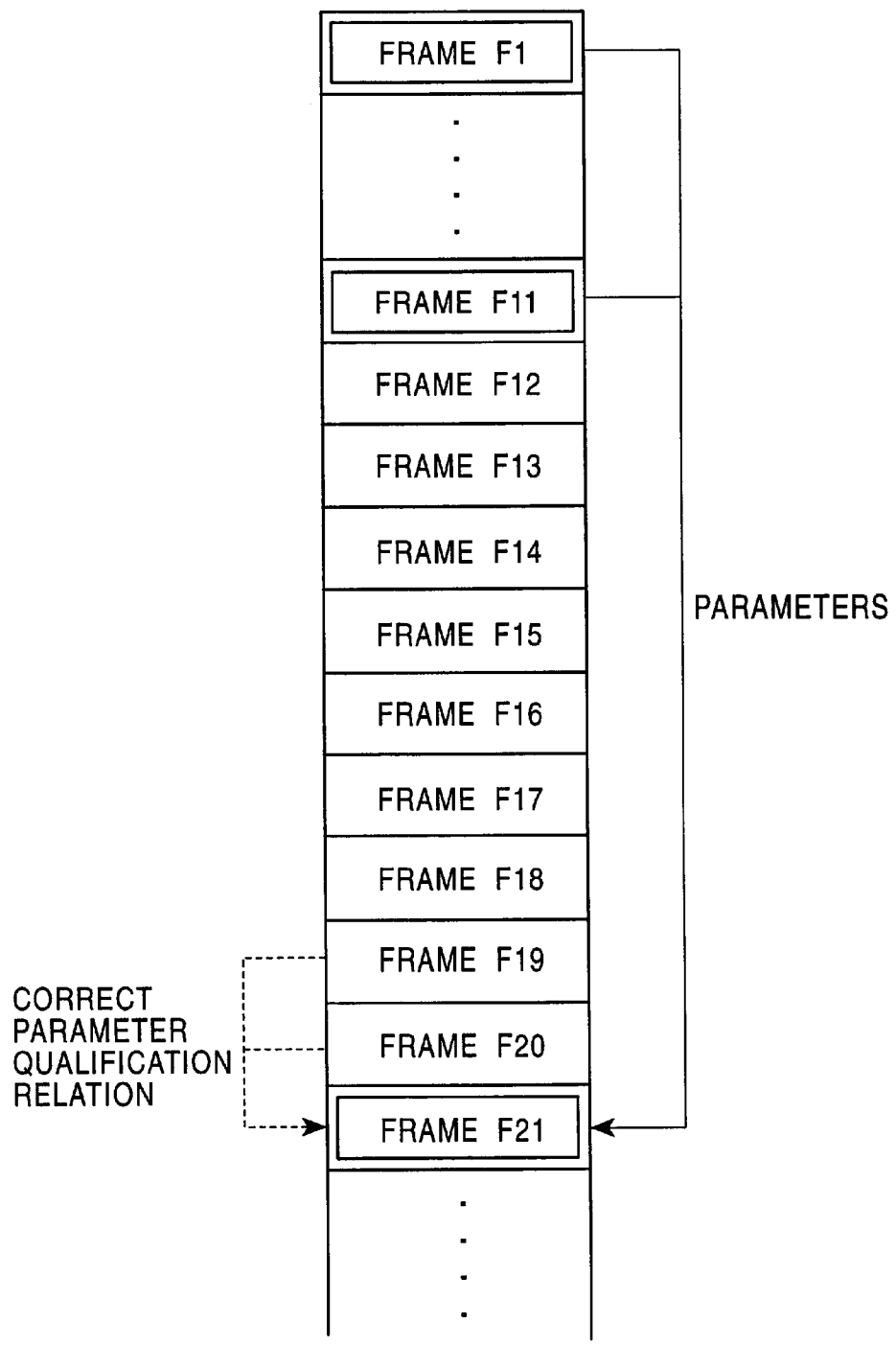
FIG. 7 is a diagram showing a state in which the same processing as that of conventional fast-forward reproduction, which has been performed for digital information, such as a conventional CD, compressed and stored by use of the TwinVQ method.

In the above state, when a fast-forward command is issued, selection is started for the next frame data to be reproduced (S203). At this time, only the LPC parameters of a frame range from a reproduction-start frame n to a pre-determined frame n+c−1 are decoded by the decoder 7c (S204) and the decoded LPC parameters are stored in an allocated memory region, for example, LPC[c][p]. An example of the stored LPC parameters of frames n to n+c−1 is shown in FIG. 6.

For the LAST-LPC[p] and LPC[c][p] regions, a distance operation is performed. The distance is obtained by the following expression and is inverse-proportional to the similarity of the two feature indexes:

Expression $$L_{\substack{[i] \\ i=0 \sim c-1}} = \sum_{k=0}^{P-1}((LPC[i][k] - LAST\_LPC[k])^2)$$

Among the frames of which LPC parameters are operated, for example, a frame having the longest distance is selected as the next frame to be reproduced (S205).

The frame determined by the microcomputer 5 as the reproduction frame is read out from the flash memory 4 and decoded by the decoder 7c. At this time, in the same manner as that for the standard reproduction, the LPC parameter of the aforementioned frame is stored in an allocated memory region, for example, LAST-LPC[p]. A signal output from the decoder 7c is converted to an analog signal through the D/A converter 8, converted to an acoustic signal, then output through the electrical acoustic converter 9.

In this way, in the music information record reproduction apparatus according to one of the embodiments of the present invention, among items of audio data which are stored in a flash memory, frame data that is the most different in feature index from the last-reproduced frame is reproduced as a reproduction frame and this reproduction processing is repeated while fast-forward commands are being issued. Therefore, even in the fast-forward reproduction, audio-data characteristics are sufficiently expressed so as to allow the listener to easily grasp reproduced parts.

In this embodiment, a frame having a larger difference from the last-reproduced frame with respect to the feature index is selected as the next target frame to be reproduced; however, an arrangement may be so that a frame having a larger variation from the adjacent frame with respect to the feature index is selected. This can be easily realized by memorizing the feature index of the immediately-previous frame instead of that of the last-reproduced frame.

Fourth Embodiment

In the above embodiment, the LPC parameter is used as the feature index. However, a parameter such as an sound power parameter, a pitch parameter, an LPC parameter, a fine structure spectrum parameter, or a combination of the foregoing parameters may also be used.

Furthermore, with the TwinVQ, in a frame that should immediately follow a sound-variation, the frame is divided into smaller subframes to change the size of processing windows. In such an arrangement, since a parameter of the frame size is also included in the compressed data, the parameter can be used to represent a larger sound-variation part.

As a method using these plural types of parameters to select the next reproduction frame, a simple method is such that operations are performed to obtain variation degrees of individual parameters and performance indices individually representing generalized variation weights. For example, regarding the sound power and pitch, previously-used parameters are stored in the same manner as the aforementioned LPC parameters and among the parameter values, a parameter having a lager differential value can be determined to be a part that represents a larger sound-variation.

Regarding the window size, since a frame in which a smaller window size is specified represents a larger sound-variation, it can be arranged to have a larger value of the variation degree. By obtaining integrated weight values representing variation degrees of the individual parameters, these values are arranged to be used as performance indices, and a method is arranged so that a frame having a reference indicator value that is larger than a predetermined threshold value is selected as the next reproduction frame.

Furthermore, the LPC parameters may be those that differ according to the audio data to be reproduced. A reproduction apparatus thus arranged can be an example of the present invention. The LPC parameter represents an envelope form of the spectrum. Therefore, a variation of the LPC parameter is a variation of an entire schematic-form of the spectrum.

In music, the aforementioned variation means that the sensation of music changes. From this viewpoint, use of the LPC parameter is appropriate, but solely relying on the use of this parameter is not yet sufficient. The LPC parameter should be used in combination with variations of the sound power and pitch to extract variation points which are closer to what humans can sense. In particular, parts where the sound power suddenly changes are points of music variation, the parameter is taken into consideration on this aspect, too.

Furthermore, in the forgoing embodiment, the present invention is applied to the arrangement of fast-forward reproduction; however, it may also be applied to an arrangement of fast-backward reproduction. Furthermore, in this embodiment, only one of predetermined frames is reproduced, however, more than one frame can also be reproduced. In this case, an arrangement is made so that, for example, in addition to a frame in a largest distance, a frame in a second largest distance is also selected.

Furthermore, in the foregoing embodiment, the number of reproduction frames may be arranged to be variable according to the reproduction speed at a fastest reproduction time. Furthermore, it will be understood as a matter of course that the present invention may also be applied to an arrangement in which a series of plural frames are reproduced at a time so that listening to any part of music allows the music to be identified.

As described earlier, while the present invention has been described with reference to what is presently considered to be the preferred embodiments, it will be understood that the invention is not limited to the disclosed embodiment. On the contrary, the invention is intended to cover various other modifications and equivalent arrangements included within the spirit and scope of the appended claims. The scope of the following claims is to be accorded the broadest interpretation so as to encompass all such modifications and equivalent structures and functions.

What is claimed is:

1. A digital information reproduction apparatus comprising:

storing means for storing digital data on a frame basis which is compressed according to a predetermined compression method;

reading means for reading the compressed digital data stored in said storing means;

parameter-calculation means for calculating a compression parameter value on the frame basis, which is used in the compression of the digital data read out by said reading means;

decoding operation means for decoding the compressed digital data read by said reading means, said decoding operation means being operatively connected to receive the compression parameter value calculated in a decoding operation by said parameter-calculation means;

reproduction-target-frame selecting means for intermittently selecting a reproduction-target frame among a plurality of frames stored in said storing means in response to a command for a fast-forward or fast-backward operation;

parameter-calculation-target-frame selecting means for selecting a parameter-calculation-target frame of the compression parameter value required for the fast-forward or fast-backward operation; and fast-reproduction controlling means for controlling said parameter-calculation means in calculating the compression parameter value of the parameter-calculation-target frame selected by said parameter-calculation-target-frame selecting means and for controlling the decoding of the compressed digital data of the reproduction-target frame that is selected by said reproduction-target-frame selecting means, wherein said parameter-calculation-target frame is selected exclusively for obtaining the compression parameter value, and wherein said parameter-calculation-target frame was not reproduced previously.

2. A digital information reproduction apparatus according to claim 1, wherein the frames are arranged to have a time-series configuration.

3. A digital information reproduction apparatus according to claim 2, wherein to decode one of the frames, the predetermined compression method uses the compression parameter value of a predetermined frame immediately-previous to the reproduction-target frame, and said parameter-calculation-target-frame selecting means selects the predetermined immediately-previous frame in response to the selection of the reproduction-target frame.

4. A digital information reproduction apparatus according to claim 3, wherein the digital data is sound data, the predetermined compression method includes a parameter representing a spectrum envelope in the compressed digital data, and the compression parameter represents a shape of the spectrum envelope.

5. A digital information reproduction apparatus according to claim 3, wherein said reproduction-target-frame selecting means selects a plurality of reproduction-target frames at identical pitches, and said parameter-calculation-target-frame selecting means selects a predetermined number of immediately-previous frames in response to the selection of the plurality of reproduction-target frames.

6. A digital information reproduction apparatus according to claim 2, further comprising a frame-feature index extracting means to calculate a feature index of each frame by using the compression parameter value output by said parameter-calculating means on the basis of a frame selected by said parameter-calculation-target-frame selecting means, in which when the command of the fast-forward operation is issued, said parameter-calculation-target-frame selecting means selects a predetermined number of frames following the immediate-previous frame reproduced, and said reproduction-target-frame selecting means selects the next reproduction-target frame in accordance with the feature indexes of plural frames which have been calculated by said frame-feature index extracting means.

7. A digital information reproduction apparatus according to claim 6, in which said reproduction-target-frame selecting means selects a frame as the next reproduction-target frame which has the most different feature index from the immediately-previous frame reproduced.

8. A digital information reproduction apparatus according to claim 6, in which said reproduction-target-frame selecting means selects a frame as the next reproduction-target frame, the difference in the feature index between the frame selected thereby and the immediately-previous frame being larger than a predetermined value.

9. A digital information reproduction apparatus according to claim 6, in which the digital data is sound-data; the compression method provides compressed digital data that comprises a parameter representing at least one item of a spectrum envelope, sound power, pitch, and window size; and the feature index is output by use of the parameter value included in the compressed digital data.

10. A digital information reproduction apparatus according to claim 9, in which the compression method is a TwinVQ method and the feature index is output by use of either an LPC parameter value or a parameter related to sound power.

11. A digital information reproduction apparatus comprising:

storing means for storing digital data on a frame basis which is compressed according to a predetermined compression method;

reading means for reading the compressed digital data stored in said storing means;

operating means for calculating a parameter value on the frame basis, which is used in the compression of the digital data read out by said reading means, and for decoding the compressed digital data, which has been read out by said reading means via a predetermined parameter value;

operation-target-frame selecting means for intermittently selecting a reproduction-target frame among a plurality of the frames stored in said storing means, and for selecting a parameter-calculation-target frame in response to a command for a fast-forward or fast-backward operation; and fast-reproduction controlling means for controlling said operation means to perform the calculation of the parameter value, and for controlling the decoding of the compressed digital data respectively in accordance with the parameter-calculation-target frame and the reproduction-target frame selected by said operation-target-frame selecting means, wherein said parameter-calculation-target frame is selected exclusively for obtaining the compression parameter value, and wherein said parameter-calculation-target frame was not reproduced previously.

12. A digital information reproduction apparatus according to claim 11, wherein said fast-reproduction controlling means sends an item to the compressed digital data read out by said reading means, the item having an additional control signal which identifies whether a frame is the reproduction-target frame or the parameter-calculation-target frame.

13. A digital information reproduction apparatus according to claim 11, wherein said fast-reproduction controlling means sends the compressed digital read out by said reading means to said operating means and also sends the control signal, which identifies whether the frame is the reproduction-target frame or the parameter-calculation-target frame, to said operating means.

14. A digital information reproduction apparatus according to claim 2, comprising an inverted-reproduction mode to perform reproduction in a sequence opposite a time-series direction.

* * * * *